(12) United States Patent
Kanemitsu et al.

(10) Patent No.: US 7,042,560 B2
(45) Date of Patent: May 9, 2006

(54) ANGLE DETECTING APPARATUS AND PROJECTOR HAVING THE SAME

(75) Inventors: Shiroshi Kanemitsu, Narashino (JP); Hirobumi Okuyama, Narashino (JP)

(73) Assignee: Seiko Precision Inc., Narashino (JP)

( * ) Notice: Subject to any disclaimer, the term of this patent is extended or adjusted under 35 U.S.C. 154(b) by 0 days.

(21) Appl. No.: 10/635,957

(22) Filed: Aug. 7, 2003

(65) Prior Publication Data

US 2004/0061848 A1   Apr. 1, 2004

(30) Foreign Application Priority Data

Aug. 8, 2002 (JP) ............... 2002-231527
Aug. 30, 2002 (JP) ............... 2002-253401
Feb. 19, 2003 (JP) ............... 2003-041202

(51) Int. Cl.
  *G01B 11/26*  (2006.01)
  *G01C 1/00*   (2006.01)

(52) U.S. Cl. ............... 356/139.1; 356/3.01; 356/152.1

(58) Field of Classification Search ............ 356/152.1, 356/139.1, 3.13, 3.14, 3.15, 3.16, 3.01

See application file for complete search history.

(56) References Cited

U.S. PATENT DOCUMENTS

| | | | | |
|---|---|---|---|---|
| 3,602,903 | A | * | 8/1971 | Requa .................. 356/141.5 |
| 4,973,156 | A | * | 11/1990 | Dainis .................. 356/141.5 |
| 5,090,803 | A | * | 2/1992 | Ames et al. ........... 356/139.03 |
| 5,196,900 | A | * | 3/1993 | Pettersen .............. 356/141.4 |
| 5,233,382 | A | * | 8/1993 | Taniguchi et al. .......... 396/113 |
| 5,485,001 | A | * | 1/1996 | Kusaka ................. 250/201.8 |
| 5,500,737 | A | * | 3/1996 | Donaldson et al. ......... 356/606 |
| 5,715,043 | A | * | 2/1998 | Hasegawa et al. ......... 356/3.14 |
| 5,760,896 | A | * | 6/1998 | Suzuki ................. 356/3.08 |
| 5,870,178 | A | * | 2/1999 | Egawa et al. ............ 356/3.03 |
| 6,021,209 | A | * | 2/2000 | Hirabayashi et al. ....... 382/103 |
| 6,046,795 | A | * | 4/2000 | Sugiyama et al. ........ 356/3.14 |
| 6,072,564 | A | * | 6/2000 | Nakamura et al. ........ 356/3.14 |

FOREIGN PATENT DOCUMENTS

| | | |
|---|---|---|
| JP | 4355740 | 12/1992 |
| JP | 00081593 | 3/2000 |

* cited by examiner

*Primary Examiner*—Thomas H. Tarcza
*Assistant Examiner*—Isam Alsomiri
(74) *Attorney, Agent, or Firm*—Adams & Wilks

(57) ABSTRACT

A control circuit computes relative horizontal and vertical inclination angles between a screen and a projector by a line-type passive range-finding device. A display driving section adjusts a projection optical system including a condensing lens on the basis of the vertical and horizontal inclination angles computed by the control circuit, thereby correcting for a keystone distortion in an image projected.

18 Claims, 8 Drawing Sheets

ANGLE DETECTING APPARATUS AND PROJECTOR HAVING THE SAME

BACKGROUND OF THE INVENTION

1. Field of the Invention

The present invention relates to an angle detecting apparatus using a line-type passive range-finding device, and to a projector having the same.

2. Description of Related Art

In a conventional projector, such as a liquid-crystal or DLP projector, there is a type of distortion known as keystone distortion which appears as a distorted shape of an image caused by an improper positional relationship between the projector and the screen. In keystone distortion, one side of the projected image is typically larger than an opposite side.

There are generally two techniques used for correcting keystone distortion, including an electric correction method in which an image generated by a video circuit is projected with a keystone distortion reverse to that of the projected image, and an optical correction method in which the inclination of a condensing lens of a projection optical system within the projector is adjusted without correcting an image generated in the video circuit.

Descriptions of the foregoing techniques for automatically correcting keystone distortion may be found, for example, in JP-A-2000-122617, JP-A-2001-339671 and JP-A-2002-62842, each of which is incorporated herein by reference.

For example, in the technique described in JP-A-2000-122617 distances to the screen are detected by two active-type range-finding sensors provided at different positions in a front surface of a liquid-crystal projector. On the basis of two detected distances and a distance between the two range-finding sensors, an inclination angle of the liquid-crystal projector relative to the screen is calculated. On the basis of this inclination angle, keystone distortion is corrected by the method mentioned above.

In the technique described in JP-A-2001-339671, an angle sensor circuit, such as gyro, is provided on a projector or a screen. On the basis of angle information obtained from such circuit, correction is made for a horizontal (left-right) keystone distortion, vertical (up-down) keystone distortion or combined horizontal-and-vertical keystone distortion.

The technique described in JP-A-2002-62842 uses a camera to detect a position and an inclination of a screen. The screen image taken by the camera is image-processed in a screen-position detecting section to thereby detect a screen position and inclination. Depending upon the detected position and inclination of the screen, a keystone distortion is corrected.

SUMMARY OF THE INVENTION

It is an object of the present invention to simplify the structure of an angle detecting apparatus not using a light emitting element for angle detection, and that of a projector having the same.

In accordance with a first aspect of the present invention, an angle detecting apparatus is provided for detecting an angular position of an object. The angle detecting apparatus comprises a line-type passive range-finding device having a pair of lenses spaced apart from each other along a baseline length, a line sensor on which a pair of images of an object are to be focused by the pair of lenses, and an operating section for carrying out a range-finding operation in a plurality of mutually different directions on the basis of an output of the line sensor. An inclination-angle computing section computes an inclination angle of the object relative to a direction of the baseline length on the basis of an operation result of the line-type passive range-finding device.

According to the foregoing structure, it is possible to realize a simple angle detecting apparatus capable of utilizing a line-type passive range-finding device of the type typically used in a camera or the like.

In accordance with a second aspect of the present invention, the inclination computing section computes an inclination angle of the object relative to the baseline length direction on the basis of an angle relative to each perpendicular to the baseline in the plurality of directions and an operation result of the line-type passive range-finding device. According to this structure, it is possible to realize a simple angle detecting apparatus capable of utilizing a line-type passive range-finding device of the type typically utilized in a camera or the like.

In accordance with a third aspect of the present invention, the inclination computing section computes an inclination angle of the object relative to the baseline length direction on the basis of a contrast center-of-gravity position of each of the line sensors in the plurality of directions and an operation result of the line-type passive range-finding device. According to this structure, it is possible to realize a simple angle detecting apparatus capable of utilizing a line-type passive range-finding device of the type typically utilized in a camera or the like.

In accordance with a fourth aspect of the present invention, the line sensor of the first aspect has a first light-receiving region on which one of the pair of images of the object is focused and a second light-receiving region on which the other of the pair of images is focused, the first and second light-receiving regions being respectively set with a plurality of range-finding operating regions corresponding to the plurality of range-finding directions. In addition, the operating region carries out range-finding operations in the plurality of range-finding directions on the basis of an output of the line sensor in the range-finding operating region in the first light-receiving region and an output of the line sensor in the range-finding operating region in the second light-receiving region, and the inclination-angle computing section computes an inclination angle of the object relative to the baseline length direction on the basis of an operation result in two range-finding directions among operation results the line-type passive range-finding device carried out range-finding operation in the plurality of range-finding directions and a value dependent upon a distance of between two of the range-finding operating regions in the first light-receiving region corresponding to the two range-fining directions. According to this structure, it is possible to realize a simple angle detecting apparatus capable of utilizing a line-type passive range-finding device of the type typically utilized in a camera or the like.

In accordance with a fifth aspect of the present invention, the value dependent upon a distance between two of the range-finding operating regions in the first light-receiving region of the fourth aspect is a distance of center positions in the baseline length direction in each of the two range-finding operating regions. According to this structure, it is possible to easily detect a value dependent upon a distance between two of the range-finding operating regions in the first light-receiving region to be used in angle detection, thus simplifying angle detection.

In accordance with a sixth aspect of the invention, the value dependent upon a distance between two of the range-finding operating regions in the first light-receiving region of the fourth aspect is a distance of contrast center-of-gravity positions of images respectively focused in the two range-finding operating regions. According to this structure, angle detection is made possible for compensating for a delicate deviation in a range-finding direction resulting from a contrast position of an image focused in each range-finding operating region, thus improving angle detection accuracy.

In accordance with a seventh aspect of the invention, the object is a screen to which an image is to be projected. According to this structure, it is possible to detect an inclination angle of the screen relative to the baseline length direction.

In accordance with an eighth aspect of the present invention, a projector is provided for projecting an image formed based on an input video signal onto a screen, and includes the inventive angle detecting apparatus and an image-distortion correcting section for correcting distortion in the image on the screen on the basis of an inclination angle computed by the angle detecting apparatus. According to this structure, it is possible to realize, by a simple structure, distortion in an image depending upon a relative inclination angle of the projector and the screen.

In accordance with a ninth aspect of the present invention, the angle detecting apparatus is provided in a projector for intermittently computing an inclination angle of the screen relative to the baseline length direction, and the image-distortion correcting section corrects distortion in the image on the screen on the basis of the intermittently computed inclination angle. According to this structure, because image distortion is corrected intermittently, even if there is a change in screen or projector setup situation and the like, distortion correction can be automatically made depending upon the change.

DESCRIPTION OF PREFERRED EMBODIMENTS

Hereinafter, an explanation is provided of a mode for carrying out the present invention based on one embodiment of a projector shown in the figures.

Figure 1:
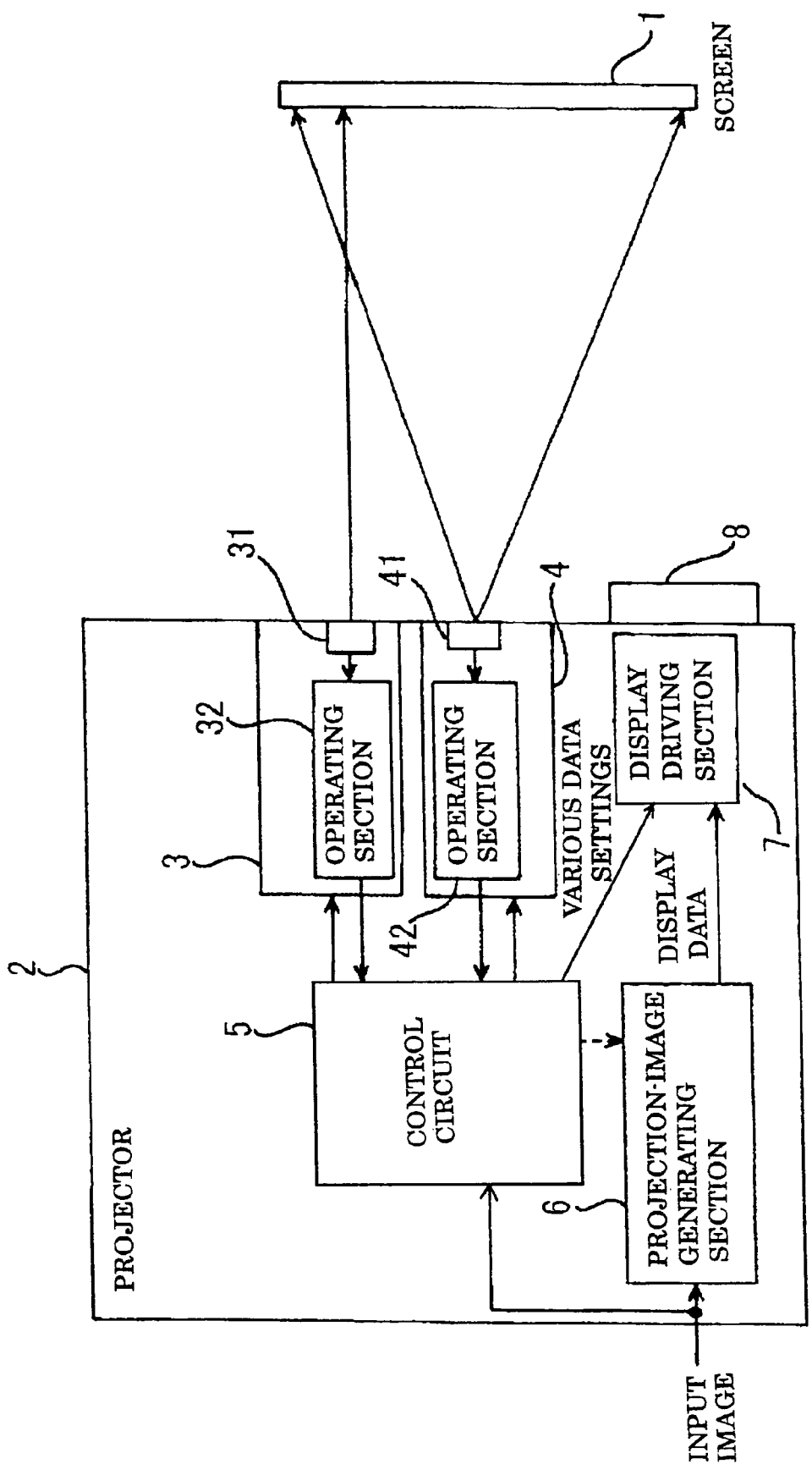
FIG. 1 is a block diagram showing one embodiment of the present invention.
Figure 2:
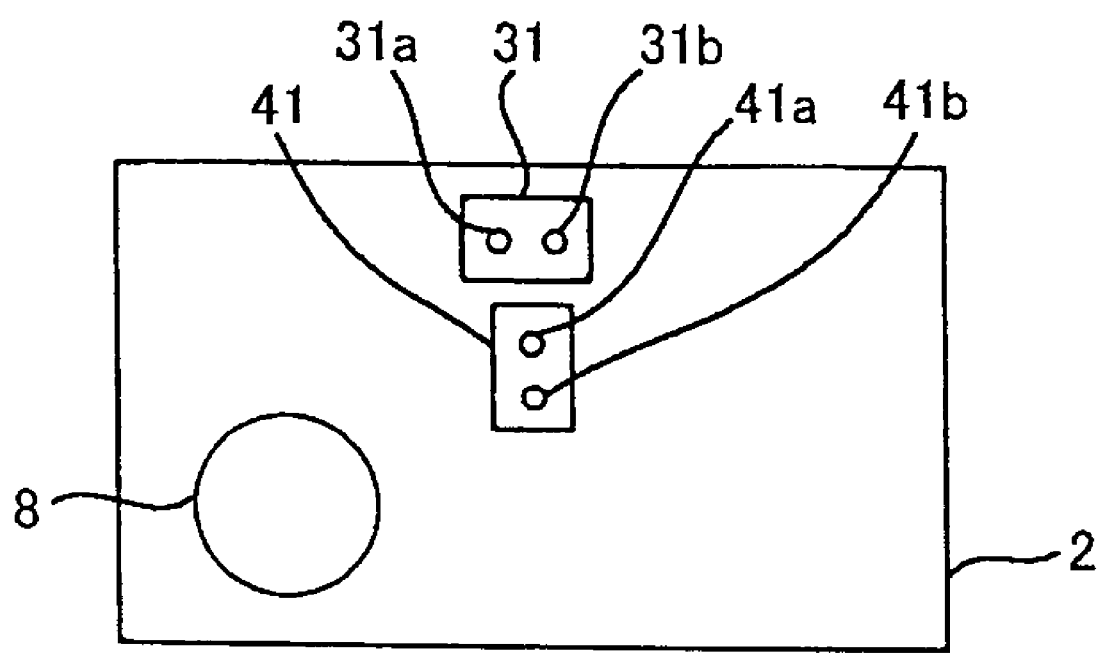
FIG. 2 is a front view of FIG. 1.

In particular, FIG. 1 is a block diagram of a projector 2 for projecting an image onto a screen 1, detecting an inclination angle of the screen 1 relative to the projector 2, and correcting for a keystone distortion in the image projected onto the screen 1 on the basis of a detected inclination,angle. FIG. 2 is a front view of the projector 2. The inclination angle detecting apparatus is not limited to being provided in a projector, and is not limited to one for detecting an inclination angle of a particular device relative to a screen.

In FIG. 1, a first line-type passive range-finding device 3 has an imaging section 31 comprising a pair of line sensors $31c$, $31d$ (hereinafter referred to as a first line sensor), a pair of lenses $31a$ and $31b$ (shown in FIG. 2) for focusing a pair of images of a screen 1 as a subject-of-measurement onto the pair of line sensors $31c$, $31d$, and an operating section 32 for carrying out range-finding operations in a plurality of mutually different directions on the basis of an output of the pair of line sensors $31c$, $31d$, to thereby detect a distance to the screen 1 at a plurality of horizontal (left-right) points. The one pair of lenses $31a$, $31b$ are arranged in a horizontally spaced-apart relation along a first baseline length b.

A second line-type passive range-finding device 4 has an imaging section 41 having a pair of line sensors $41c$, $41d$ (hereinafter referred to as a second sensor) and lenses $41a$, $41b$ (shown in FIG. 2) for focusing a pair of images of the screen 1 onto the pair of line sensors $41c$, $41d$, and an operating section 42 for carrying out a range-finding operation in a plurality of mutually different directions on the basis of an output of the pair of line sensors $41c$, $41d$, to thereby detect a distance to the screen 1 at a plurality of vertical (up-down) points. The pair of lenses $41a$, $41b$ are arranged in a vertically spaced-apart relation along a second baseline length b'.

A control circuit 5 serves as first and second inclination angle computing sections and carries out various controls and operations, e.g., computes a relative horizontal inclination angle between the screen 1 and the projector 2 (in a first baseline direction) on the basis of a range-finding operation result of the first line-type passive range-finding device 3, and a relative vertical inclination angle between the screen 1 and the projector 2 (in a second baseline direction) on the basis of a range-finding operation result of the second line-type passive range-finding device 4.

A projection image generating section 6 inputs image data output from an image data output section of an external personal computer or the like, converts the input image data into display data, and outputs the display data to a display driving section 7.

The display driving section 7 serves as an image distortion correcting section by adjusting an optical projection system 8 including a condensing lens on the basis of a horizontal or vertical inclination angle computed by the control circuit 5, to thereby correct for keystone distortion in a projected image. Next, referring to FIG. 3, explanation is provided of the operation principle of the line-type passive range-finding devices (which utilize an external-light trigonometric range-finding scheme) 3, 4.

Incidentally, although the line-type passive range-finding device 3 and the line-type passive range-finding device 4 are different in installation angle, they are of the same structure. Thus, an explanation is provided of only the first line-type passive range-finding device 3 in order to simplify the explanation. The corresponding structural relationship between the two devices is as follows. The pair of lenses 41a, 41b of the second line-type passive range-finding device 4 correspond to the pair of lenses 31a, 31b of the first line-type passive range-finding device 3. The pair of line sensors 41c, 41d of the second line-type passive range-finding device 4 correspond to the pair of line sensors 31c, 31d of the first line-type passive range-finding device 3. The imaging section 41 of the second line-type passive range-finding device 4 corresponds to the imaging section 31 of the first line-type passive range-finding device 3. The operating section 42 of the second line-type passive range-finding device 4 corresponds to the operating section 32 of the first line-type passive range-finding device 3.

Figure 3:
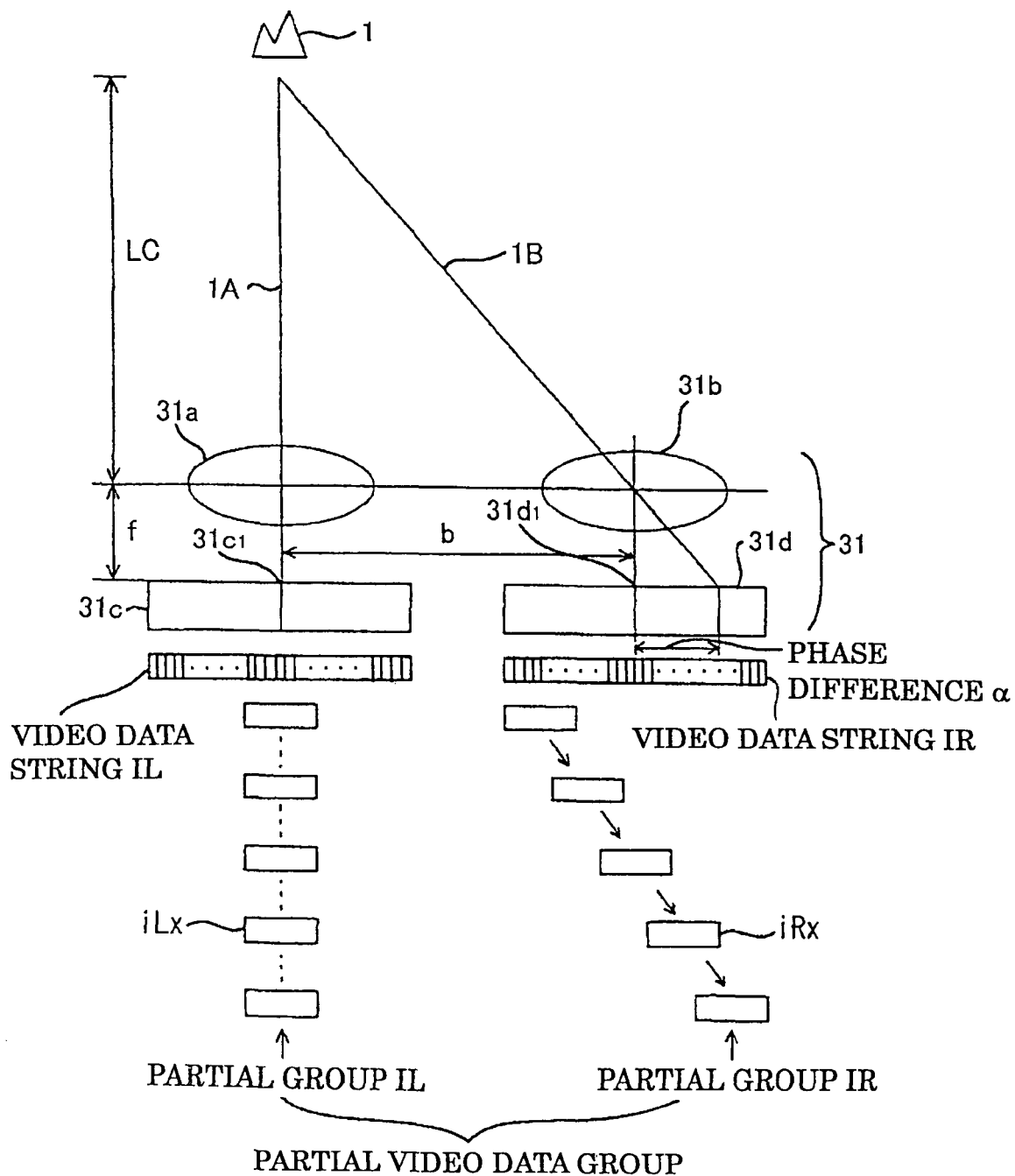
FIG. 3 is a figure showing a range-finding principle of a line-type passive range-finding device of FIG. 1.

In FIG. 3, the pair of lenses 31a, 31b are arranged in a spaced-apart relation along a baseline by a predetermined baseline length b and focus respective images of the object or subject-of-measurement (the screen 1) through mutually different optical paths 1A and 1B, onto the pair of optical sensor arrays 31c and 31d. The pair of optical sensor arrays 31c, 31d are spaced from the pair of lenses 31a, 31b by a focal length f of the lenses. The subject-of-measurement 1 is disposed forward of the lenses 31a, 31b at a distance LC from the lenses 31a, 31b.

When the subject-of-measurement 1 exists at a theoretically infinite distance from the lenses 31a, 31b, an image center focused on the pair of optical sensor arrays 31c and 31d is focused on the optical sensor arrays 31c, 31d at a reference position (31c1, 31d1,) aligned with an optical axis of the lenses 31a, 31b. However, when the subject-of-measurement 1 is closer to the lenses 31a, 31b than infinity, a center of an image focused by the lenses 31a, 31b is at a position deviated a from the reference positions 31c1, 31d1. Based on the known principle of trigonometric range-finding, the distance LC to the subject-of-measurement 1 is given as LC=b f/α.

Since the baseline length b and the focal length f are known constants, detection of the amount of deviation α makes it possible to measure the distance LC. This is the basic operating principle of the passive-type range-finding device for external-light trigonometric range-finding which is carried out by the operating section 32.

The deviation amount a from the reference position is detected by a correlation operation carried out by the operating section 32 of FIG. 1 on respective partial image data groups iL, iR extracted from a pair of image signals (image data strings) IL, IR output by the pair of line sensors 31c, 31d. This correlation operation is a well known operation in which the regions highest in degree of coincidence are detected when the partial image data group iL, iR is superposed as shown in FIG. 3 while relatively deviating the superposing partial image data group iL, iR in an arrangement direction of an optical sensor array.

When performing the correlation operation, by fixing one partial image data group iL as a reference part depending upon a reference position, as shown in FIG. 3, and deviating the other partial image data group iR as a reference part, the optical axis direction of lens 31a can be taken as a range-finding direction. However, in the case that the range-finding direction is taken as a direction from a center position of both lenses, the one partial image data group iL and the other partial image data group iR may be relatively deviated.

Figure 4:
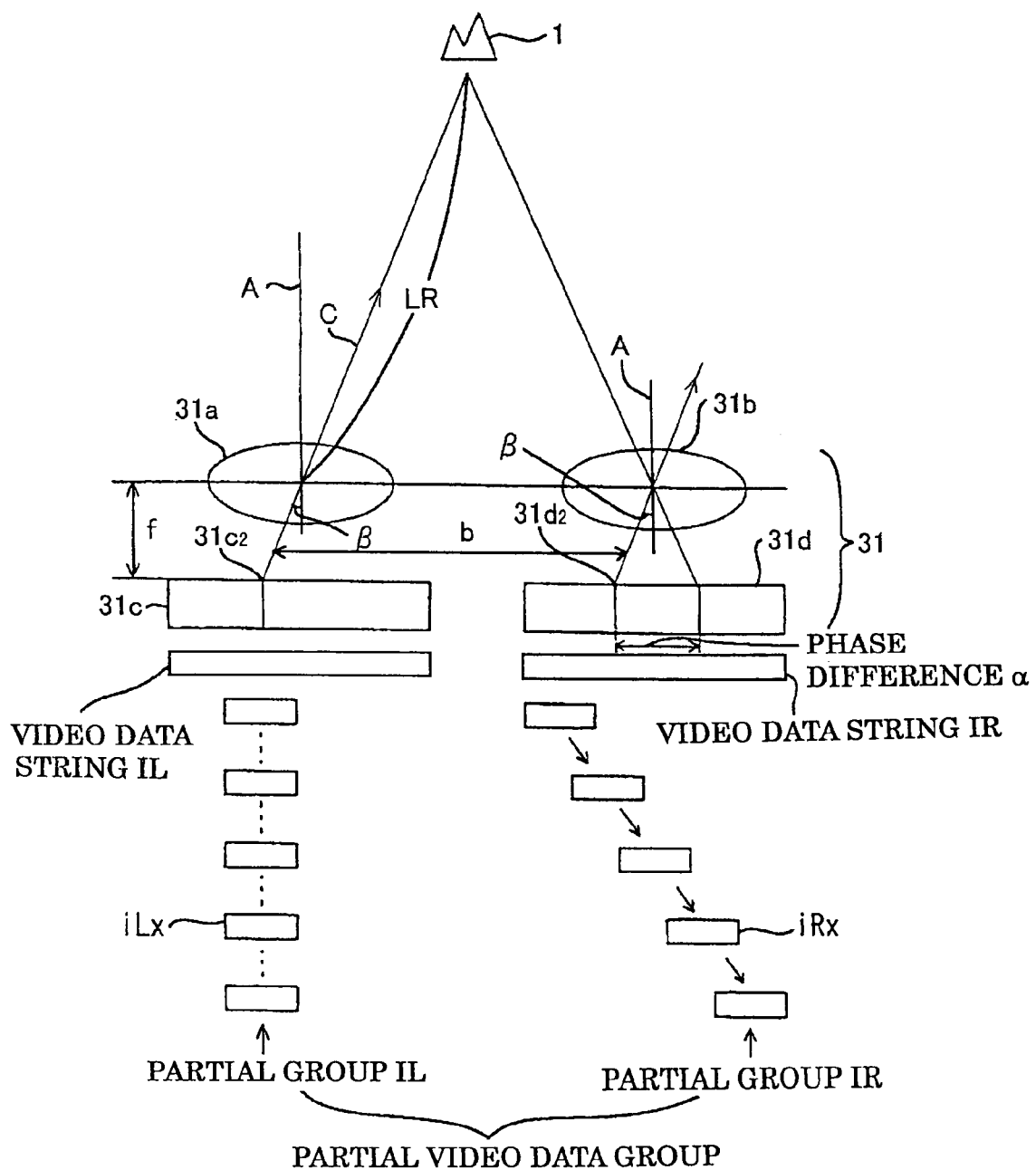
FIG. 4 is a figure showing a range-finding principle of a line-type passive range-finding device of FIG. 1.

Next, referring to FIG. 4, an explanation is made of a range-finding principle of the line-type passive range-finding device in a case a direction different from the front is taken as a range-finding direction.

In FIG. 4, assuming that an image focused on the pair of optical sensor arrays 31c and 31d when the subject-of-measurement 1 exists at an infinite distance in a direction C to be measured has a center taken as a reference position (31c2, 31d2), when the subject-of-measurement 1 is closer than infinity in the range-finding direction C, an image of the subject-of-measurement 1 is focused by the lenses 31a, 31b at a position a deviated from the reference position 31c2, 31d2. From the trigonometric range-finding principle, the distance LR to the subject-of-measurement 1 is LR=bf/(αcos β). Incidentally, the angle β is an inclination angle of the range-finding direction C with respect to a line A perpendicular to the baseline, and is fixed by the measuring direction C. Herein, because the baseline length b, the focal length f and cos β are constants, detecting a deviation amount α enables measurement of a distance LR. This is the range-finding principle in the case of a range-finding direction different in direction from the front. Furthermore, the distance LR' of a straight line extending from the baseline to the subject-of-measurement 1 is LR'=LR cos β=bf/α. Thus, when detecting a deviation amount α, the distance LR' can be measured, thereby making it unnecessary to determine the angle β in determining LR'.

In addition, when performing the correlating operation, by fixing one partial image data group iL as a reference part as shown in FIG. 4 and deviating the other partial image data group iR as a reference part, the direction C deviated by an angle β relative to an optical axis of the lens 31a can be taken as a range-finding direction. Accordingly, by setting a plurality of reference positions in accordance with a range-finding direction, it is possible to detect distances in a plurality of directions by one line-type passive range-finding device.

The presently described embodiment detects an inclination angle of the screen 1 relative to a projector 2 by utilizing the line-type passive range-finding devices 3, 4 described above.

Figure 5:
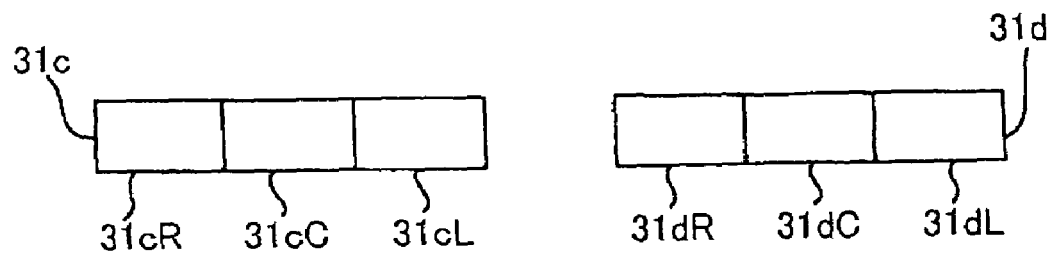
FIG. 5 is a figure showing a plurality of range-finding operating regions of one pair of line sensors $31c$, $31d$ of this example.

When carrying out a range-finding operation in a plurality of directions using one line-type passive range-finding device, there are provided a plurality of range-finding operating regions (31cR, 31cC, 31cL) depending upon a plurality of reference positions based on a plurality of range-finding directions (for instance, R (right), C (center), L (left) in the illustrated example) in the line sensor 31c, as shown in FIG. 5, and a plurality of range-finding operating regions (31dR, 31dC, 31dL) depending upon a plurality of reference positions based on a plurality of range-finding directions (R, C, L) in the line sensor 31d, to determine a deviation amount from the reference position by using the partial image data in one pair of range-finding regions (31cR and 31dR, 31cC and 31dC, 31cL and 31dL) in correspondence in the range-finding direction. Incidentally, although the illustrated embodiment uses the three range-finding directions of R (right), C (center) and L (left), the range-finding directions are not limited to those but can be appropriately changed.

Operation of the present embodiment for detecting an inclination angle of the screen 1 relative to a projector 2 will now be explained.

When the device power is turned on or the device is activated, the control circuit 5 determines whether or not there has been an input of image data. In case image data has or is being input, a projection-image generating section 6 outputs display data corresponding to the image data so that an image may be projected onto the screen 1 by the display driving section 7 and the optical projection system 8. When image data is not being input, so-called contrast image data is output for adjustment. Such data is pre-stored within the control circuit 5 and is output to the projection-image generating section 6 to cause an image to be projected onto the screen 1 according to the contrast image data. This operation is performed to display a contrast image on the screen 1 that is capable of being detected by the line-type passive range-finding devices 3, 4.

In the absence of a projected image capable of being read by the range-finding devices 3, 4, deterioration in the range-finding accuracy of the line-type passive range-finding devices 3, 4 would occur. In this manner, the projection of a contrast image for preventing the line-type passive range-finding devices 3, 4 from deteriorating in range-finding accuracy (inclination angle detection) is carried out by utilizing the image projecting function discussed herein. This makes it unnecessary to provide an exclusive projection section for performing the range-finding operation, thereby making it possible to simplify the overall projector structure. Meanwhile, because the range-finding operation is based on image projection, the measurable distance is dependent upon a distance range in which projection is possible. Accordingly, there is no need to adjust a range-finding limit distance and a projection limit distance of the line-type range-finding devices.

Subsequently, the control circuit 5 operates the first and second line-type passive range-finding devices 3, 4 so that each is caused to detect a distance to the screen 1 in a plurality of directions.

More specifically, the control circuit 5 computes a horizontal (first baseline-length direction) inclination angle of the screen 1 relative to the projector 2 on the basis of a range-finding computation result of first the line-type passive range-finding device 3, and computes a vertical (second baseline-length direction) inclination angle of the screen 1 relative to the projector 2 on the basis of a range-finding computation result of the second line-type passive range-finding device 4.

Figure 6:
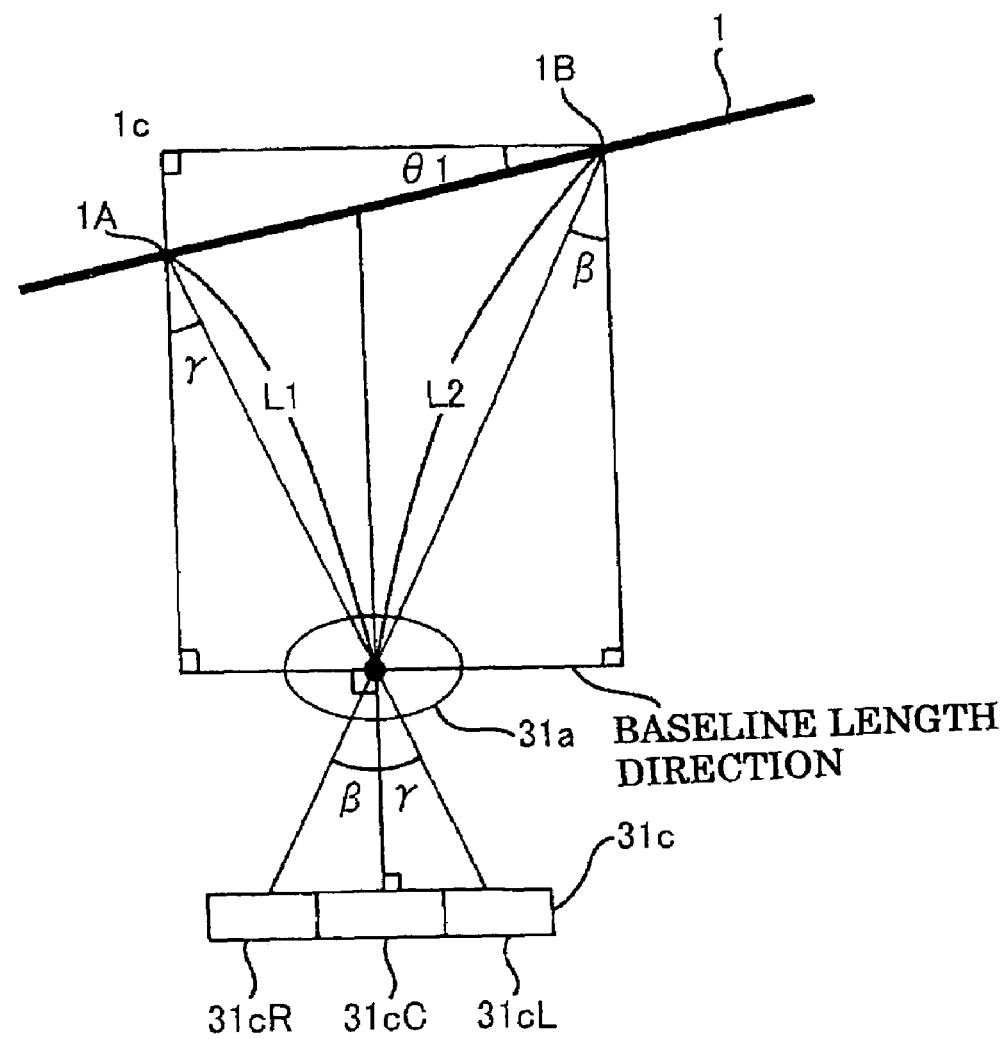
FIG. 6 is a figure showing a detecting scheme of an inclination angle of FIG. 1.

FIG. 6 is a view for explaining an example of computing inclination angles as mentioned above. Incidentally, this example includes computations for inclination angle detection in a horizontal (left-right) direction, inclination angle detection in a vertical (up-down) direction or combined inclination angle detection in horizontal and vertical directions. However, because inclination angle detection is performed similarly in both directions, an explanation is provided only of horizontal inclination angle detection using the first line-type passive range-finding device 3. The same operations are performed for vertical inclination angle detection using the second line-type range-finding device 4.

As shown in FIG. 6, the inclination angle of the screen 1 relative to a baseline length direction (horizontal direction of the projector 2) of the line-type passive range-finding device 3 is $\theta 1$. The result of the range-finding operation using a range-finding operating region $31cL$ is $L1$ and the result of the range-finding operation using a range-finding operating region $31cR$ is $L2$. The angle between a range-finding direction corresponding to the range-finding operating region $31cR$ and a perpendicular line extending from the baseline is $\beta$, and the angle between a range-finding direction corresponding to the range-finding operating region $31cL$ and a perpendicular line extending from the baseline is $\gamma$, then the inclination angle $\theta 1$ is represented by the following formula:

$$\tan \theta 1 = (L2 \cos \beta - L1 \cos \gamma)/(L1 \sin \gamma + L2 \sin \beta).$$

Incidentally, the angles $\beta$, $\gamma$ are constants to be determined in a design stage or the like as stated before, the values of which are previously stored within the control circuit 5. It is possible to determine a vertical inclination angle $\theta 2$ of the screen 1 relative to a baseline length direction (vertical direction to the projector 2) of second line-type passive range-finding device 4, in a manner similar to that described above.

Accordingly, the inclination angles $\theta 1$ and $\theta 2$ can be determined by the control circuit 5 in the foregoing manner.

Thus, it is possible to realize a simple inclination-angle detecting apparatus utilizing a line-type passive range-finding device of the type typically used in a camera or the like.

Figure 7:
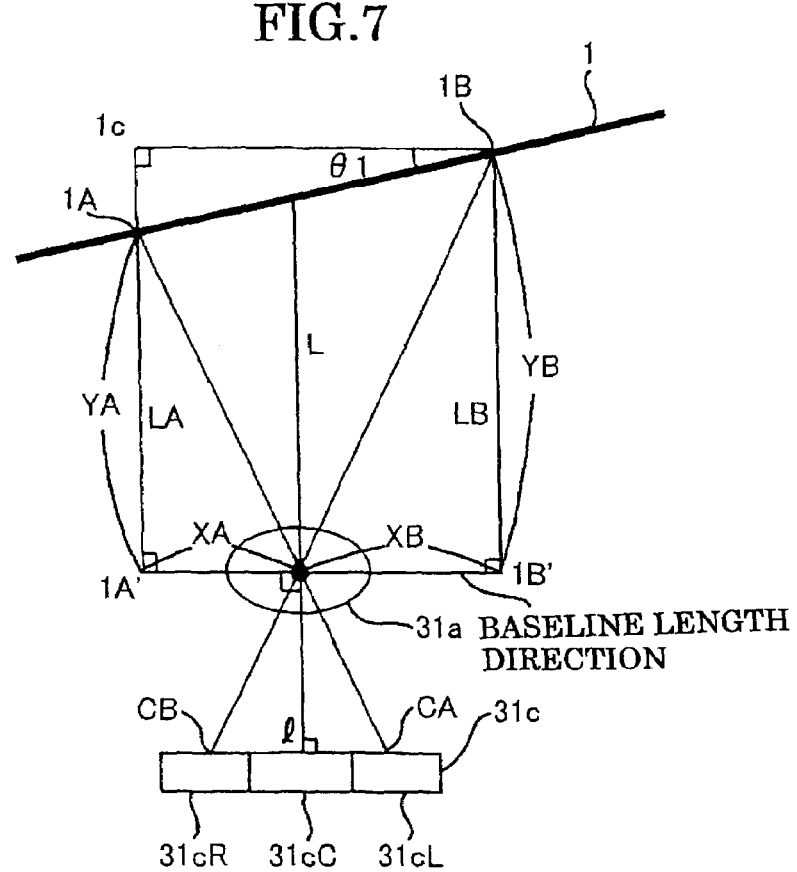
FIG. 7 is a figure showing a detecting scheme of an inclination angle in another embodiment of the invention.

Next, another embodiment of the invention is explained with reference to FIG. 7. FIG. 7 is a view for explaining another embodiment for computing an inclination angle between the baseline and the screen 1 as mentioned above. In this embodiment also, only the process computing an inclination angle is described. The same or similar structure as in the above embodiment is identified with the same reference numerals and a duplicate explanation thereof is omitted. As in the above-described embodiment, this embodiment includes detectors for inclination angle detection in a horizontal (left-right) direction, inclination angle detection in a vertical (up-down) direction, or combined inclination angle detection in horizontal and vertical directions. Since each uses a similar scheme, an explanation is made only for horizontal inclination angle detection using a line-type passive range-finding device 3.

As shown in FIG. 7, provided that the inclination angle of the screen 1 relative to a baseline length direction (horizontal direction of the projector 2) of the line-type passive range-finding device 3 is $\theta 1$, the straight line passing a range-finding point 1A on the screen 1 and parallel with an optical axis L of the lens $31a$ is LA, the straight line passing a range-finding point 1B on the screen 1 and parallel with the optical axis L is LB, the intersection between the baseline length and the straight line LA is 1A', the intersection between the baseline length and the straight line LB is 1B', the distance between the point 1A' and the perpendicular to an optical axis L is XA, the distance between the point 1B' and the perpendicular to optical axis L is XB, the result of the range-finding operation using the range-finding operating region $31cL$ is YA and the result of range-finding operation using the range-finding operating region $31cR$ is YB, then the inclination angle $\theta 1$ is represented by the following formula:

$$\tan \theta 1 = (YB - YA)/(XA + XB).$$

In this embodiment, YA:XA=f:P(CA−I) is held because of triangular analogy. If this is expanded, the following formula applies: XA=PYA(CA−I)/f. In the foregoing formulae, CA is a pixel number corresponding to a position of contrast center-of-gravity of an area A focused on the sensor plane, I is a pixel number of line sensor corresponding to the optical axis, P is a pixel pitch of line sensor, and f is a focal length. Similarly, XB can be expressed by:

$$XB = PYB(CB - I)/f.$$

Herein, CB is a pixel number corresponding to a position of contrast center-of-gravity of an area B focused on the sensor plane. Incidentally, P and f are constants to be determined in the design stage or the like, the values of which are previously stored within the control circuit 5.

It is possible to determine an inclination angle $\theta 2$ of the screen 1 relative to a baseline length direction (vertical direction to the projector 2) of line-type passive range-finding device 4, by a principle similar to the above.

Accordingly, the inclination angles θ1 and θ2 can be determined by the operation of the control circuit 5.

Thus, it is possible to realize a simple inclination-angle detecting apparatus utilizing a line-type passive range-finding device of the type typically utilized in a camera or the like.

Referring to FIGS. 8–12, another embodiment of the invention will be explained. FIGS. 8 to 12 are views for explaining another embodiment for determining an inclination angle as described above. In this embodiment, an explanation is given only of a method of computing the inclination angle. The same or similar structure as that described above is designated with the same reference numerals and a duplicate explanation is omitted. As in the above description, this embodiment includes detectors for inclination angle detection in a horizontal (left-right) direction, inclination angle detection in a vertical (up-down) direction, or combined inclination angle detection in horizontal and vertical directions. However, because a similar scheme is used by each, an explanation is provided only of horizontal inclination angle detection using a line-type passive range-finding device 3.

Figure 8:
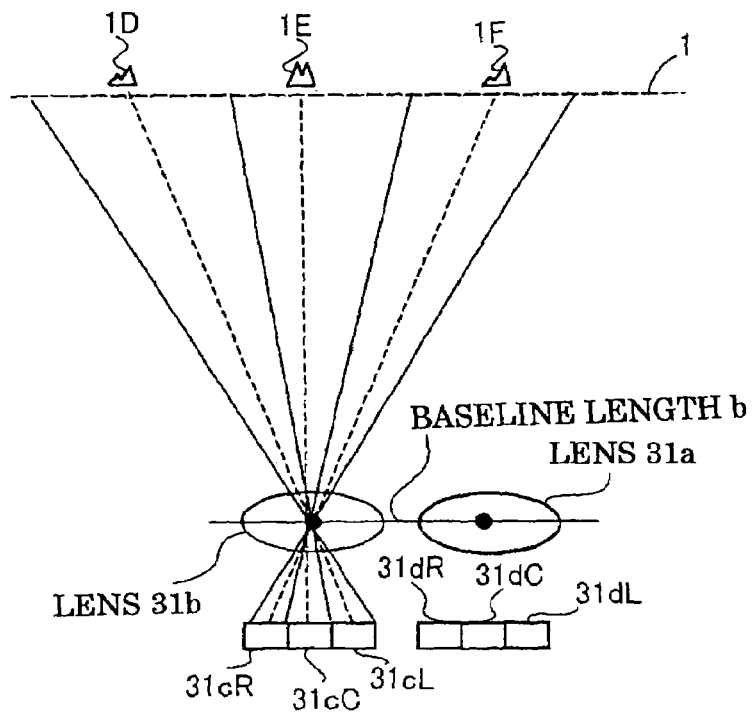
FIG. 8 is a figure showing a detecting scheme of an inclination angle in another embodiment of the invention.

FIG. 8 is a view for explaining a pre-adjusting process on the line-type passive range-finding device 3 within the projector. In this embodiment, the line-type passive range-finding device 3 performs a range-finding direction on objects that are not located directly in front thereof and outputs, as a result of the range-finding computation, a distance of from a straight line from the baseline length to the subject-of-measurement 1. Consequently, in the case of range-finding operations on objects 1D, 1E and 1F on a screen 1 parallel with a baseline length b direction as shown in FIG. 8, the range-finding operation results (phase difference) for the subject-of-measurements 1D, 1E, 1F are ideally the same. In practice, however, the same results are not obtainable because of the effects of aberration in each range-finding operating region, or the like. Consequently, in this embodiment, correction coefficients are computed and pre-stored to make these operation results the same in each range-finding direction. The correction coefficients are stored in an EEPROM or the like within the operating section, so that during range-finding operations, the proper correction coefficient is utilized to correct for variations in range-finding operation results. Accordingly, in the case of range-finding the subject-of-measurement 1 on a straight line parallel with the baseline length b direction, the same operation result, i.e., distance of from a straight line the baseline length is extended to the subject-of-measurement 1, is obtainable even if range-finding is in any direction of range finding (range-finding operating region).

Figure 9:
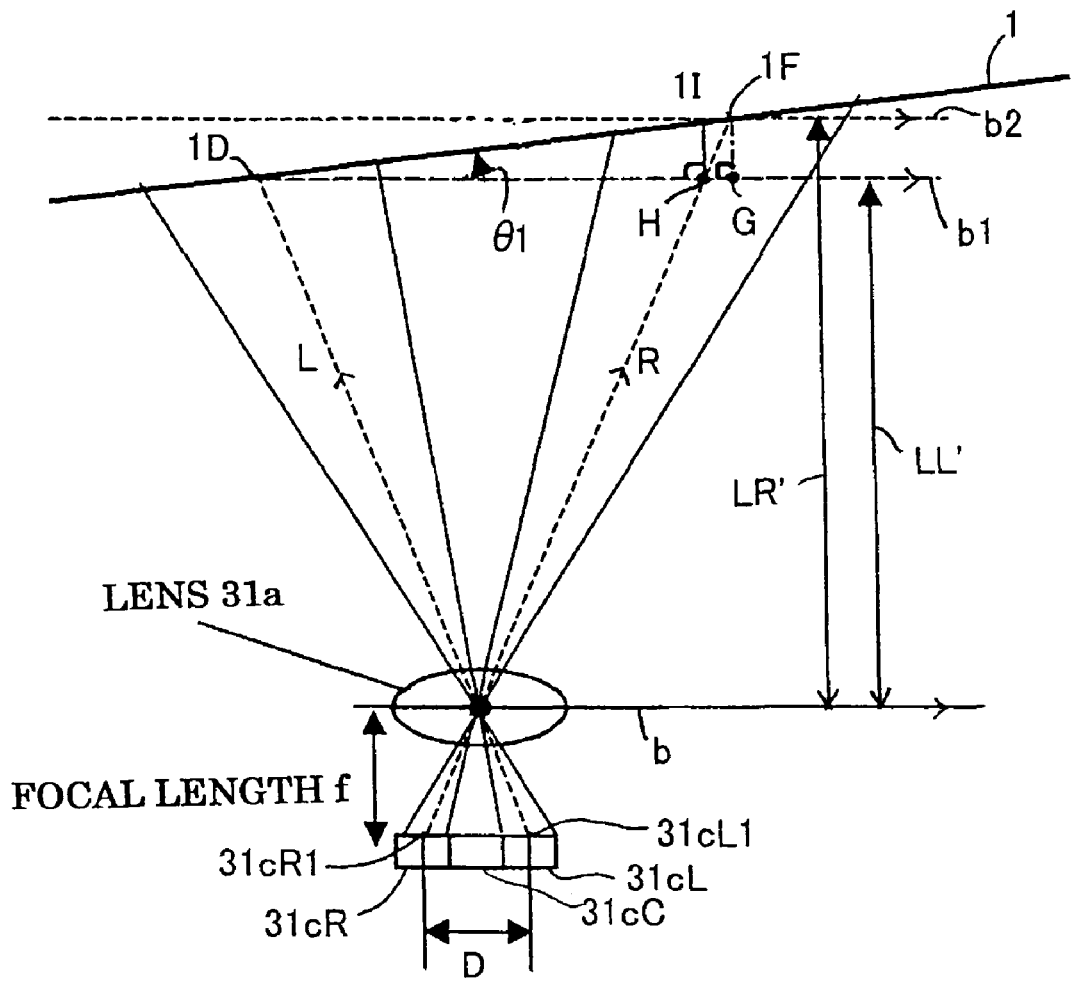
FIG. 9 is a figure showing a detecting scheme of an inclination angle in another embodiment of the invention.

FIG. 9 shows an example of a range-finding operation when the screen 1 is inclined by angle (inclination angle) θ1 relative to the baseline length b direction (horizontal direction of projector 2) by using the line-type passive range-finding device 3 adjusted as described above. The range-finding operation result when using a range-finding operation region 31cR is LR'. The range-finding operation result when using a range-finding operation region 31cL is LL'. The straight line passing a range-finding point 1D on the screen 1 and parallel with the baseline length b is b1. The straight line passing a range-finding point IF on the screen 1 and parallel with the baseline length b is b2. The intersection between a perpendicular to the straight line b1 passing the range-finding point IF and the straight line b1 is G. The intersection between a range-finding direction R and the straight line b1 is H. The intersection between a perpendicular to the straight line b1 passing a point H and the screen 1 is 1I. The distance between the range-finding operation regions 31cR and 31cL is D. In this embodiment, the intersection between a range-finding direction R and a range-finding operation region 31cR is 31cR1. The intersection between a range-finding direction L and a range-finding operation region 31cL is 31cL1. The distance between a point 31cR1 and a point 31cL1 is the distance D.

In this case, the distance between a range-finding point IF and a point G is LR'−LL'. Namely, it is a difference between the distance LR' and the distance LL'.

Figure 10:
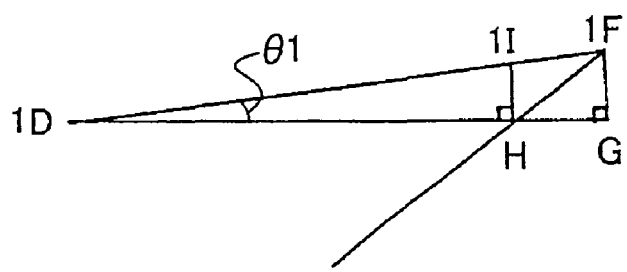
FIG. 10 is a magnified view of a portion of FIG. 9.

As shown in FIG. 10, where the angle θ1 is small, the distance between the range-finding point 1F and the point G and the distance between the point H and the point 1I are nearly equal, the distance between the point H and the point 1I is nearly equal to LR'−LL'. The angle θ1 in this embodiment is an inclination angle of the projector 2 relative to the screen 1. When projecting an image from the projector 2 onto the screen 1, it is unlikely that the angle θ1 is excessively great. Thus, it is unlikely that a significant problem will be encountered if the distance between the point H and the point 1I is practically considered to be LR'−LL'. For example, in the case of using a portable projector 2 to project an image onto the screen 1, the user sets up the projector. Usually, rough angular adjustment of both are then carried out by the user during setup.

Figure 11:
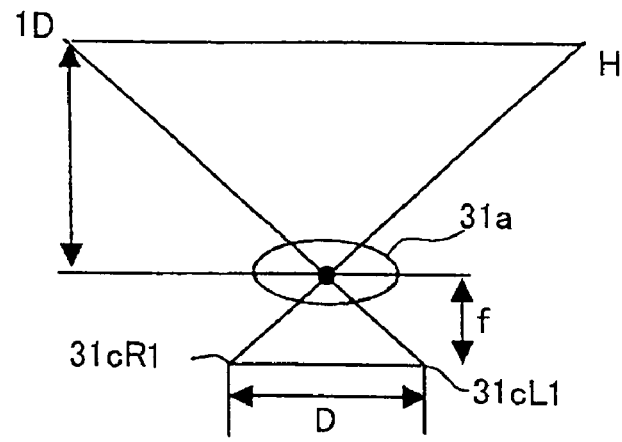
FIG. 11 is a magnified view of a portion of FIG. 9.

Meanwhile, as shown in FIG. 11, because the triangle formed by a range-finding point 1D, a point H and a center of lens 31a is analogous to the triangle formed by a point 31cR1, a point 31cL1 and the center of lens 31a, the distance between the range-finding point 1D and the point H is LL' D/f.

Figure 12:
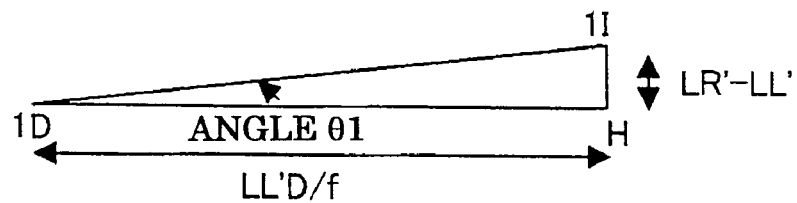
FIG. 12 is a magnified view of a portion of FIG. 9.

Accordingly, as shown in FIG. 12, from the rectangular triangle configured by the range-finding point 1D, the point H and the point 1I, the inclination angle θ1 can be determined from the following formula:

$$\theta1 = \arctan((LR'-LL')/(LL' D/f)).$$

Incidentally, although in the above description the distance D between the range-finding operating regions 31cR and 31cL is a distance between the point 31cR1 and the point 31cL1, it may instead be a distance between a center position of range-finding operating region 31cR in a baseline length direction and a center position of range-finding operating region 31cL in the baseline length direction. In this case, there is no need to detect an intersection with a range-finding direction on the range-finding operating region, making it possible to easily detect a value depending upon a distance between the two range-finding operating regions for use in angular detection. Thus, angle detection is simplified.

If high accuracy is required in angle detection, the value dependent upon a distance between the two range-finding operating regions for use in angular detection may use a distance of contrast center-of-gravity position in each range-finding operating region. An example of this case is explained below with reference to FIG. 13.

It is well known that passive-type range finding involves an operation for detecting a state where a highest degree of coincidence between a pair of superposed images. In this embodiment, the degree of coincidence concerns whether or not the pair of images are coincident in contrast.

Figure 13:
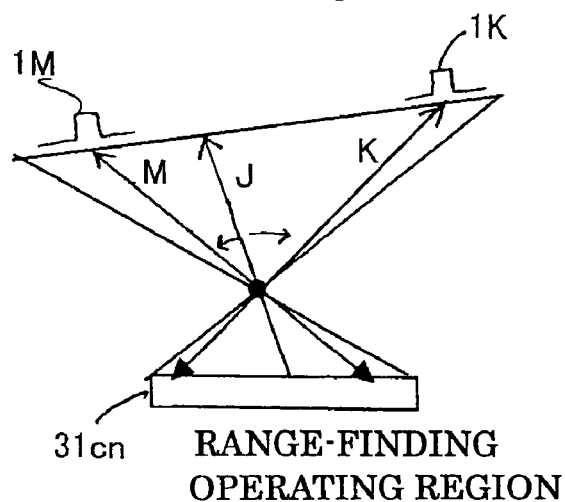
FIG. 13 is an explanatory view of a contrast center-of-gravity position.

Accordingly, in passive-type range finding, a certain range-finding operating region 31cn has a designed range-finding direction in the direction of an arrow J, as shown in FIG. 13. In the case where the image of the subject of range finding 1 to be focused on the range-finding operating region 31cn is an image for which a contrast position 1K exists only in the direction of an arrow K, the actual direction of range finding deviates from the direction of arrow J to the direction of arrow K. In the case where the image of the subject of range finding 1 to be focused on the range-finding operating region 31cn is an image for which a contrast position 1M exists only in the direction of an arrow M, the actual direction of range finding deviates from the direction of arrow J to the direction of arrow M. Meanwhile, in the case where the image of the subject of range finding 1 to be focused on the range-finding operating region 31cn is an image for which contrast positions 1K and 1M exist in the directions of arrow K and arrow M, the actual direction of range finding deviates from the direction of arrow J to a contrast center-of-gravity position of an image focused on the range-finding operating region 31cn.

Accordingly, in case the value dependent upon a distance between the two range-finding operating regions for use in angular detection uses a distance of a contrast center-of-gravity position in each range-finding operating region, it is possible to use an accurate distance D thereby improving angle detection accuracy. Incidentally, the method of determining a contrast center-of-gravity position is known, as disclosed by JP-A-8-75985. Thus, a detailed explanation thereof is omitted herein.

In this manner, it is possible to realize a simple inclination-angle detecting apparatus utilizing a line-type passive range-finding device typically used in a camera or the like.

In each of the above embodiments, in case inclination angles θ1 and θ2 are determined, the control circuit 5 outputs the determined inclination angles θ1 and θ2 to the display driving section 7. The display driving section 7 adjusts the projection optical system 8 including a condensing lens on the basis of the horizontal and vertical inclination angles computed by the control circuit 5, thereby correcting for keystone distortion in the projected image.

As discussed herein, although keystone distortion in a projection image is optically corrected by adjusting the projection optical system 8 including a condensing lens on the basis of the horizontal and vertical inclination angles computed by the control circuit 5, the display data of an image having keystone distortion reverse to a projected image may be generated on the basis of the horizontal and vertical inclination angles computed by the control circuit 5 in the projection image generating section 6, thereby electrically correcting the keystone distortion in the projected image.

When inclination angles θ1 and θ2 are determined, the control circuit 5 stops the line-type passive range-finding devices 3, 4 from operating, thereby ending angle detecting and keystone distortion correcting operations.

Incidentally, after determining the inclination angles θ1 and θ2, the control circuit 5 causes the line-type passive range-finding devices 3, 4 again to operate intermittently at predetermined times to again detect inclination angles θ1 and θ2. On the basis of the detected inclination angles θ1 and θ2, the keystone distortion correction operations may be again carried out. In this manner, image distortion is corrected intermittently. Accordingly, even where the screen or projector changes from a setup position or the like, distortion correction can be automatically performed in accordance with the change in position.

As described above, elimination of image distortion caused by relative inclination angle between the projector and screen can be realized by a simple structure utilizing a line-type passive range-finding device of the type typically used in a camera or the like.

Incidentally, in each of the above embodiments, inclination angle is detected in a plurality of directions by using two line-type passive range-finding devices, to carry out keystone distortion on the basis of each detection result. However, it is possible to use one line-type passive range-finding device and detect an inclination angle in one direction, so that keystone distortion can be corrected on the basis of one detected inclination angle.

Also, although inclination angle was detected in vertical and horizontal directions as a plurality of different directions by two line-type passive range-finding devices, the plurality of different directions are not limited to the vertical and horizontal directions but can be changed appropriately.

In addition, although the subject-of-measurement was a screen in the above-described embodiments, the subject-of-measurement is not limited to a screen and may be a wall or other appropriate subject.

The present invention is not limited to the foregoing embodiments but can be carried out with any changes that do not change the gist of the invention. According to the present invention, the structure of an inclination-angle detecting apparatus can be simplified by utilizing a line-type passive range-finding device of the type conventionally used in cameras or the like, and the structure of a projector having means for correcting for keystone distortion in a projected image depending upon an inclination angle to the screen can also be simplified.

What is claimed is:

1. An angle detecting apparatus for determining an inclination angle of a screen, comprising: one or more line-type passive range-finding devices for performing a range-finding operation, each line-type passive range-finding device having a pair of lenses spaced apart from each other by a baseline length, a line sensor disposed behind the lenses so that a pair of images of an object on the screen are focused by the respective lenses onto the line sensor, and an operating section for performing the range-finding operation in a plurality of mutually different directions on the basis of an output of the line sensor; and an inclination-angle computing section for computing an inclination angle of the screen relative to a direction of the baseline length in a plane that includes the baseline and the different directions on the basis of an output of the line-type passive range-finding device.

2. An angle detecting apparatus according to claim 1; wherein the output of each line-type passive range-finding device is a distance from the lenses to the object on the screen in each of the different directions.

3. An angle detecting apparatus according to claim 1; wherein the one or more line-type passive range-finding devices comprise a plurality of line-type passive range-finding devices for performing range-finding operations in different directions.

4. An angle detecting apparatus according to claim 1; wherein the one or more line-type passive range-finding devices comprise a first line-type passive range-finding device having a first baseline length direction and a second line-type passive range-finding device having a second baseline length direction perpendicular to the first baseline length direction.

5. An angle detecting apparatus according to claim 1; wherein the inclination-angle computing section computes an inclination angle of the screen relative to the baseline length direction in each of the different directions on the basis of an angle relative to a line perpendicular to the baseline length direction and the output of the line-type passive range-finding device.

6. An angle detecting apparatus according to claim 1; wherein the inclination-angle computing section computes an inclination angle of the screen relative to the baseline length direction in each of the different directions on the basis of a contrast center-of-gravity position of each of the images on the line sensor and the output of the line-type passive range-finding device.

7. An angle detecting apparatus according to claim 1; wherein the line sensor has a plurality of light-receiving regions including at least a first light-receiving region on which one of the pair of images of the object is focused and a second light-receiving region on which the other of the pair of images of the object is focused, the first and second light-receiving regions comprising a plurality of range-finding operating regions corresponding to the plurality of range-finding directions; the operating section performs range-finding operations in the plurality of range-finding directions on the basis of outputs of the line sensor in the first and second light-receiving regions; and the inclination-angle computing section computes an inclination angle of the screen relative to the baseline length direction on the basis of outputs of the line sensor in two different range-finding directions based on the output of the line-type passive range-finding device in the plurality of range-finding directions and a value dependent upon a distance between two of the range-finding operating regions in the first light-receiving region corresponding to the two range-finding directions.

8. An angle detecting apparatus according to claim 7; wherein the value dependent upon a distance between two of the range-finding operating regions in the first light-receiving region is a distance of center positions in the baseline length direction in each of the two range-finding operating regions.

9. An angle detecting apparatus according to claim 7; wherein the value dependent upon a distance between two of the range-finding operating regions in the first light-receiving region is a distance of contrast center-of-gravity positions of images respectively focused in the two range-finding operating regions.

10. A projector for projecting an image formed in accordance with an input video signal onto a screen, comprising: an angle detecting apparatus for determining an inclination angle of the screen, the angle detecting apparatus including one or more line-type passive range-finding devices for performing a range-finding operation, each line-type passive range-finding device having a pair of lenses spaced apart from each other by a baseline length, a line sensor disposed behind the lenses so that a pair of images of an object which is an image projected on the screen are focused by the respective lenses onto the line sensor, and an operating section for performing the range-finding operation in a plurality of mutually different directions on the basis of an output of the line sensor; and an inclination-angle computing section for computing an inclination angle of the screen relative to a direction of the baseline length on the basis of an output of the line-type passive range-finding device; and an image-distortion correcting section for correcting distortion in the projected image on the basis of the inclination angle computed by the angle detecting apparatus.

11. A projector according to claim 10; wherein the angle detecting apparatus intermittently computes an inclination angle of the screen relative to the baseline length direction, and the image-distortion correcting section corrects distortion in the projected image on the basis of the intermittently computed inclination angle.

12. A projector comprising: an image generating section for generating an image to be projected and outputting display data; a display section having a projection optical system including a condensing lens and a display driving section for receiving the display data and driving the projection optical system to project the image onto a surface based on the display data; a pair of lenses spaced apart from each other by a baseline length; a sensor disposed behind each lens onto which images of the surface are focused; an operating section for performing a range-finding operation in a plurality of mutually different directions on the basis of outputs of the sensors; and a control circuit for computing an inclination angle of the surface relative to a direction of the baseline length on the basis of outputs of the sensors and controlling one of the image generating section and the projection optical system on the basis of the inclination angle to correct for keystone distortion in the projected image.

13. A projector according to claim 12; wherein the sensors comprise adjacent segments of a line sensor.

14. A projector according to claim 12; wherein the lenses, the sensors, and the operating section are comprised of lenses, a line sensor, and an operating section of a first line-type passive range-finding device.

15. A projector according to claim 12; further comprising a second line-type passive range-finding device oriented perpendicularly with respect to the first line-type passive range-finding device; wherein the control circuit computes inclination angles based on outputs of the first and second line-type passive range-finding devices.

16. A projector according to claim 12; wherein the control circuit computes the inclination angle on the basis of an angle relative to a line perpendicular to the baseline length direction and outputs of the sensors.

17. A projector according to claim 12; wherein the control circuit computes the inclination angle on the basis of a contrast center-of-gravity position of each of the images on the sensors and outputs of the sensors.

18. A projector comprising: an image generating section for generating an image to be projected and outputting display data; a display section having a projection optical system including a condensing lens and a display driving section for receiving the display data and driving the projection optical system to project the image onto a surface based on the display data; one or more line-type passive range-finding devices for performing a range-finding operation each having a pair of lenses spaced apart from each other by a baseline length, a line sensor disposed behind the lenses so that a pair of images of the surface are focused by the respective lenses onto the line sensor, and an operating section for performing the range-finding operation in a plurality of mutually different directions on the basis of an output of the line sensor; and a control circuit for computing an inclination angle of the surface relative to a direction of the baseline length on the basis of an output of the line-type passive range-finding device, and controlling one of the image generating section and the projection optical system on the basis of the inclination angle to correct for keystone distortion in the projected image.

* * * * *